July 6, 1965  W. F. MONTAG  3,192,585
HANGER CLIP AND CLOTHES PIN
Filed Aug. 16, 1963
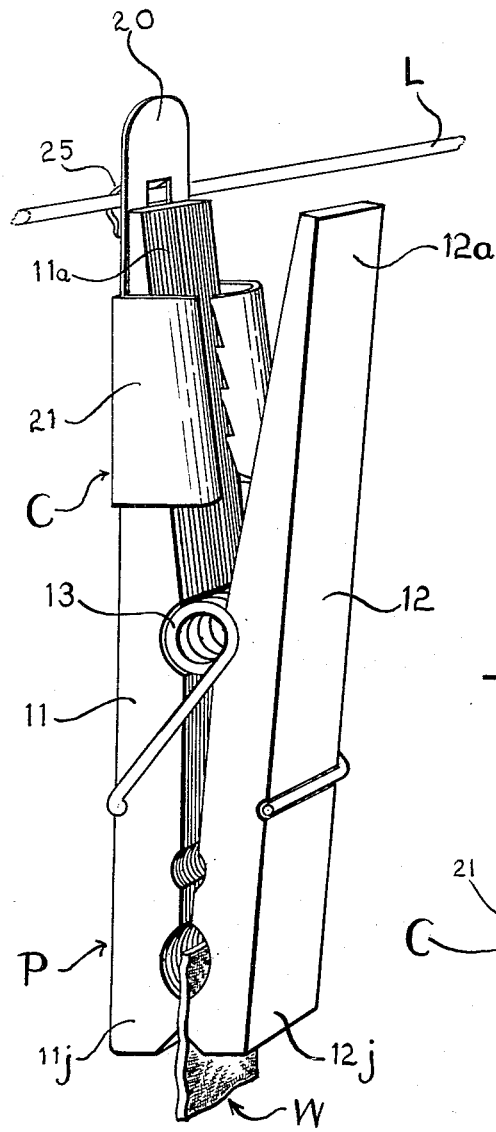
Fig. 1
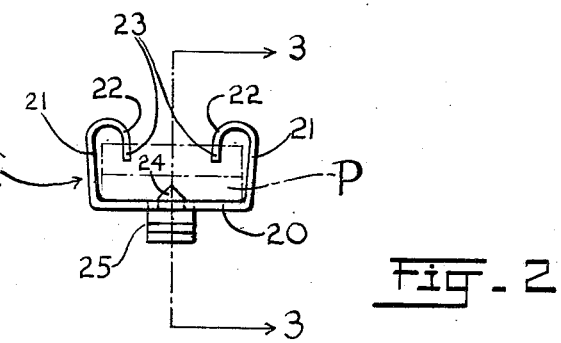
Fig. 3
Fig. 2
INVENTOR
WALTER F. MONTAG
BY: Philip D. Golrick
ATTORNEY

United States Patent Office 3,192,585
Patented July 6, 1965

3,192,585
HANGER CLIP AND CLOTHES PIN
Walter F. Montag, 16146 Puritas Ave., Cleveland 35, Ohio
Filed Aug. 16, 1963, Ser. No. 302,606
6 Claims. (Cl. 24—137)

The present invention relates generally to a spring type clothes pin and hanger clip combination and more particularly to an improvement in adapter clips for hanging spring type clothes pins from a line or thin rod or other like object.

Although the phrase "spring type clothes-pin" is hereinafter used to designate the article with which the hanger clip of this invention is used, because of the more common and apparently original purpose for which such pins were produced, this is not to be understood as a limitation upon the advantageous use or functionality of the combination.

Various forms of devices have hitherto been proposed for use in combination with a standard spring type clothes pin whereby the latter is adapted to be attached to or hung on a line, for example, so that the pin may then be operated for grasping or releasing an object ultimately suspended from the line without involving the object gripping jaws and action in the purchase or connection of the pin on the line.

A device of such character used in combination with the pin has the objects and advantages that manipulation of the pin for article clamping or releasing does not inherently affect the connection of the pin with the line; the suspended article do not come in contact with the line; or the pin may be left more or less permanently attached to the line remaining oriented for easy grasp and insertion of pieces to be hung.

The present invention has the further specific object of providing a hanger clip for use with spring clothes pins which, in addition to attaining the aforementioned objects, is easily and securely applied to the pin and is of a simple, low cost sturdy construction.

Other objects and advantages will appear from the following description and the drawing wherein:

FIG. 1 is a perspective view showing a hanger clip according to the present invention in use to hang a pin from a line;

FIG. 2 is a bottom end view of the hanger clip; and

FIG. 3 is a longitudinal section through the clip taken as indicated by the line 3—3 in FIG. 2, a portion of the pin structure and of the line L being represented in dashed lines.

In FIG. 1 of the drawing, a standard spring type clothes pin P is shown suspended from a line L by a hanger clip or adapter device C, and gripping an object or work piece W represented in fragmentary form.

The pin P is comprised of two like lever members 11, 12 of substantially uniform width, pivotally secured together by an interposed spring element 13. Spring 13 has a helical body seated in opposed grooves of the members as a fulcrum, and its opposite ends are carried out tangentially to terminate in free end portions bent perpendicularly into parallelism and seated in respective shallow grooves across the flat outside lever faces not only to secure them together in pivotal relation, but also to apply a closing bias to the lower or jaw portions 11j, 12j.

The upper lever portions, the operating arms 11a, 12a above the fulcrum, are each tapered to a narrow end, affording increased clearance between the inner faces whereby the jaws may be opened wider; but the cross section of each lever is substantially rectangular throughout its length. Usually members 11, 12 are made of hard wood, in recent years not infrequently of molded plastic, and at times even of metal such as aluminum.

The clip C, substantially symmetrical about a longitudinal center-plane at line 3—3 and preferably a spring steel stamping, includes an elongated generally flat base or body portion 20, and side portions 21, 21 brought out along about the lower half into approximately parallel relation to terminate in longitudinally sloping, inwardly turned and reflected channel-like formations 22, 22 having the sheared free edges serrated to provide pin-engaging tooth means 23. There is also provided further pin arm engaging tooth means by the inwardly staked or partially sheared triangular point or barb 24 located centrally between sides or walls 21.

In the upper portion (left end in FIG. 3) of the body 20 extending beyond the sides 21, a hook-like downwardly facing lug 25 is struck out and shaped to provide a mouth or entrance converging to a narrowed retaining throat 25a above which a somewhat larger space is provided to receive the line or wire L.

The side and particular shape of lug 25 may be varied for intended line size range.

It will be noted that with the wider end of the trapezoidal sides at the clip bottom, there is formed a convergent, in effect somewhat socket-like, formation for reception of the one pin operating tapered arm 11a. The minimum spacing of the effective tooth 23 nearest body 20 must of course be sufficient to permit the end of arm 11a to pass therebeyond. The ends of the serrations 23 in each set fall on a line making with the body 20 substantially the taper angle of the arm 11a of a standard pin of this type. Also the long sloping face of each tooth 23 is directed inwardly and downwardly to terminate in a sharp short shoulder forming the other face of the tooth. The spacing of the walls 21 is somewhat wider than the pin arm width plus expected positive manufacturing tolerances, so that the clip is easily slipped over the end of one pin arm, and with a slight manual force seated thereon with the serrations 23 (and also barb 24 where used) firmly gripping the arm to prevent withdrawal except by application of considerable force.

The shape of sides and reflected free edge formations, and of resulting open-bottomed "socket" need not be as shown; the essential requirement being the stated slope of the serration tip lines, and their mutual spacing less than the pin arm width.

Once the adapter or hanger is so applied, the pin combination is easily applied on a suspension point such as a line (or a wire, cord, rod, nail or the like) within the size range of hook 25, simply by engaging the latter thereover with downward pressure until the throat formation 25a passes over the line. Thereafter the pin by its center-of-gravity location normally hangs with jaws downward, so that the arms 11a, 12a are easily and quickly grasped to open the jaws for article insertion or removal. The portion of the article gripped is distal from the wire or line L, and the jaw area is in nowise occupied or diminished by the presence of the line as in usual application of the pin.

The rounded or somewhat inverted U-shape of the channel formations bearing the inwardly directed serrations (i.e. toward the flat base portion) avoids sharp bends or corners, advantageous in ease of production and decreased likelihood of failure of metal in use, tending to distribute stresses upon application to a pin.

The adapter is useful not only with the common hardwood pins, but also with plastic pins; and, with suitable hardness of the spring metal, further with pins of metal such as aluminum for the loading ordinarily to be carried by such pins.

It will be noted that although the walls 21 are described as brought into approximately parallel relation—which for the broader advantages of the invention is quite adequate—in FIG. 2 those sides are actually somewhat divergent outwardly from the body portion 20. This has been found advantageous should it be desired for any reason to remove the clip from the object, since the otherwise firm grip of a clip, on a wooden pin especially, is decreased by squeezing the divergent portions toward each other.

From the aforegoing description it can be seen that the unitary clip C is adapted for low cost, high rate production from sheet or strip spring steel stock by modern stamping and forming techniques.

What is claimed is:

1. The combination,
    with a spring type clothes-pin having a pair of operating lever arms at least one of which is tapered in thickness toward its end,
    of a hanger clip formed of metal and adapted to engage said one arm and a line from which the combination is to be suspended;
    said clip comprising:
        a generally flat elongated body portion,
        side portions integral with and bent out of the plane of the body portion toward each other to a spacing somewhat greater than the width of said one arm,
        the margins of said side portions being turned inward toward each other and reflected back toward, and terminating in edges spaced from, said body portion and shaped to provide respective sets of serrations in a spaced relation less than said width,
        the tips of said serrations lying substantially in a plane inclined inwardly toward the body portion at an angle approximating the taper angle of said one arm and in respective lines inclined toward the body portion,
        whereby said arm is received endwise and retained between said body portion and serrations, and
        integral means of said body portion of a hook-like form adapted to receive said line.

2. The combination of claim 1 wherein said body portion includes an inward struck tooth formation opposite said serration sets.

3. The combination of claim 1 wherein the side portions diverge from the body portion out to said margins.

4. An adapter clip to be applied to an object of softer material as a hanger clip for suspending said object from a line,
    said clip comprising:
        a generally elongated body portion,
        side portions integral with and bent out from the body portion toward each other into spaced relation somewhat greater than the width of said object,
        the margins of said side portions being turned inward toward each other and reflected back toward, and terminating in edges spaced from, said body portion and shaped to provide respective sets of serrations in a spaced relation less than the width of said object,
        the tips of said serrations lying substantially in a plane longitudinally inclined inwardly toward the body portion and in respective lines similiarly inclined toward the body portion,
        whereby said object is receivable endwise and retained between said body portion and serrations, and
        a lug struck out of said body portion into a hook-like form adapted to receive said line.

5. The combination of claim 4 wherein said body portion includes an inward struck tooth formation opposite said serration sets.

6. The clip of claim 4, wherein the side portions diverge from the body portion out to said margins.

References Cited by the Examiner
UNITED STATES PATENTS

| | | | |
|---|---|---|---|
| 248,394 | 10/81 | Betts | 24—265 |
| 431,694 | 7/90 | Harris | 24—265 |
| 943,135 | 12/09 | Boyer | 24—265 |
| 1,499,292 | 6/24 | Claus | 24—137 |
| 1,918,115 | 7/33 | Luft | 24—6 |
| 2,209,697 | 7/40 | Kislingbury et al. | |

DONLEY J. STOCKING, *Primary Examiner.*